United States Patent
Maertens et al.

(10) Patent No.: US 8,311,101 B2
(45) Date of Patent: Nov. 13, 2012

(54) RATE CONTROL FOR REAL TIME TRANSCODING OF SUBTITLES FOR APPLICATION WITH LIMITED MEMORY

(75) Inventors: Gregory R. Maertens, Milan (IT); Diego Vianello, Mestre-Venezia (IT)

(73) Assignee: LSI Corporation, Milpitas, CA (US)

( * ) Notice: Subject to any disclaimer, the term of this patent is extended or adjusted under 35 U.S.C. 154(b) by 1248 days.

(21) Appl. No.: 12/102,173

(22) Filed: Apr. 14, 2008

(65) Prior Publication Data

US 2009/0219440 A1    Sep. 3, 2009

Related U.S. Application Data

(60) Provisional application No. 61/032,191, filed on Feb. 28, 2008.

(51) Int. Cl.
*H04N 7/12* (2006.01)
(52) U.S. Cl. .............. 375/240.08; 386/239; 386/244
(58) Field of Classification Search .......... 375/240.08
See application file for complete search history.

(56) References Cited

U.S. PATENT DOCUMENTS

| | | | | |
|---|---|---|---|---|
| 5,848,217 | A * | 12/1998 | Tsukagoshi et al. | 386/239 |
| 6,185,229 | B1 * | 2/2001 | Obikane et al. | 370/537 |
| 2007/0206932 | A1 * | 9/2007 | Kato | 386/111 |
| 2008/0075163 | A1 * | 3/2008 | Brydon et al. | 375/240.02 |

* cited by examiner

*Primary Examiner* — Jay Au Patel
*Assistant Examiner* — Jessica Prince
(74) *Attorney, Agent, or Firm* — Christopher P. Maiorana, PC

(57) ABSTRACT

An apparatus comprising an estimation circuit, a rate control circuit, a queue circuit, and an encoder circuit. The estimation circuit may be configured to generate a size value in response to an input signal comprising (i) a plurality of frames and (ii) a plurality of embedded subtitle elements. The rate control circuit may be configured to (i) generate a control signal, (ii) pass through the plurality of frames, (iii) present a first one or more of subtitle elements for current processing in response to the size value, and (iv) present a second one or more of subtitle elements for subsequent processing. The queue circuit may be configured to (i) receive the second one or more subtitle elements, (ii) present the second one or more of subtitle elements for current processing when the control signal is in a first state and (iii) hold a second one or more subtitle elements for subsequent processing when the control signal is in a second state. The encoder circuit may be configured to generate an output signal in response to (i) the plurality of frames, (ii) the first one or more subtitle elements, and (iii) the second one or more subtitle elements.

9 Claims, 3 Drawing Sheets

RATE CONTROL FOR REAL TIME TRANSCODING OF SUBTITLES FOR APPLICATION WITH LIMITED MEMORY

This application claims the benefit of U.S. Provisional Application No. 61/032,191, filed Feb. 28, 2008 and is hereby incorporated by reference in its entirety.

FIELD OF THE INVENTION

The present invention relates to video transcoding generally and, more particularly, to a method and/or apparatus for implementing rate control for real time transcoding of subtitles for application with limited memory.

BACKGROUND OF THE INVENTION

Conventional systems implement transcoding between different multimedia standards. Transcoding converts an audio or video signal from one format to another format. If a video signal has embedded subtitles, transcoding presents some unique difficulties. In particular, for real time encoding in the context of consumer electronics with limited memory, rate control is a key element of the encoding process. Subtitles have variable duration elements, where traditional audio/video (A/V) applications have fixed duration elements (i.e., audio frames and video field/frames). Conventional standards have some kind of buffer modeling to guarantee decoders with limited memory will be able to decode the bitstream. However, such systems are not compatible between different standards and systems.

It would be desirable to implement a system with rate control and/or real-time transcoding of subtitles in the context of consumer electronics device.

SUMMARY OF THE INVENTION

The present invention concerns an apparatus comprising an estimation circuit, a rate control circuit, a queue circuit, and an encoder circuit. The estimation circuit may be configured to generate a size value in response to an input signal comprising (i) a plurality of frames and (ii) a plurality of embedded subtitle elements. The rate control circuit may be configured to (i) generate a control signal, (ii) pass through the plurality of frames, (iii) present a first one or more of subtitle elements for current processing in response to the size value, and (iv) present a second one or more of subtitle elements for subsequent processing. The queue circuit may be configured to (i) receive the second one or more subtitle elements, (ii) present the second one or more of subtitle elements for current processing when the control signal is in a first state and (iii) hold a second one or more subtitle elements for subsequent processing when the control signal is in a second state. The encoder circuit may be configured to generate an output signal in response to (i) the plurality of frames, (ii) the first one or more subtitle elements, and (iii) the second one or more subtitle elements.

The objects, features and advantages of the present invention include providing a transcoding system that may (i) provide rate control, (ii) be implemented in a variety of environments, (iii) be useful in a system with limited memory and/or (iv) be implemented with a minimal amount of circuitry.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Transcoding is typically used to convert an audio and/or video signal from one format to another format. Audio and video signals are normally implemented as a continuous stream of data. The data during the compression process is normally sampled at a fixed rate. For example, audio is normally sampled at 44.1 kHz for compact discs (CDs). Video is normally sampled at 50 Hz for PAL systems. Other sampling rates may also be implemented. Further down the compression process, fixed size units are used to describe the key units, such as audio samples, video field/frame information, etc.

Transcoding audio and video streams with subtitles provides challenges not present when transcoding audio and video streams without subtitles. If a subtitle element is considered the smallest element that can be seen on a screen at a given time, then a subtitle element may have a variable duration on the screen. The subtitle element may appear for a very short time in one instance, or a very long time in another instance. The size (in bytes) of an encoded subpicture is normally variable, ranging from several bytes to several kilobytes.

Figure 1:
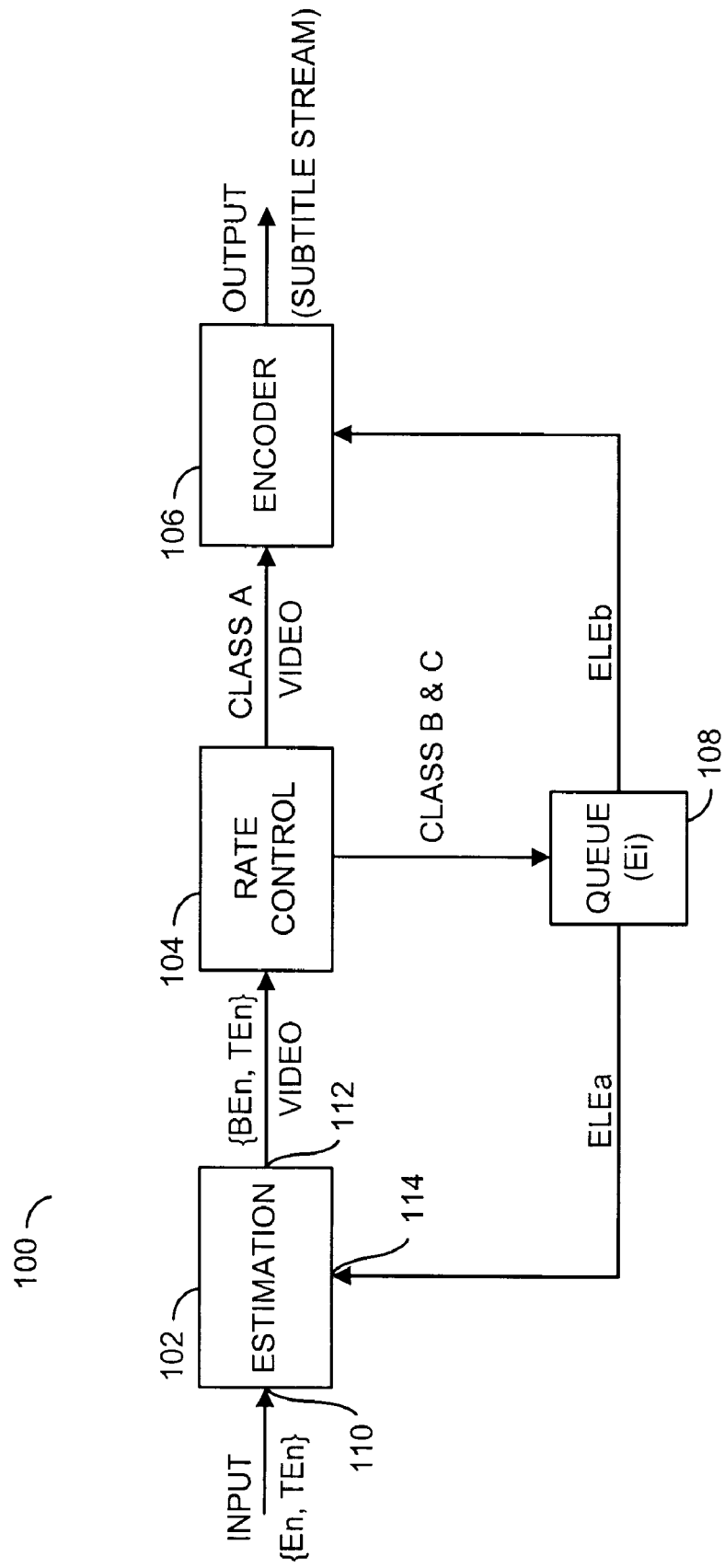
FIG. 1 is a block diagram of an embodiment of the present invention.

Referring to FIG. 1, a block diagram of a system 100 is shown in accordance with a preferred embodiment of the present invention. The system 100 generally comprises a block (or circuit) 102, a block (or circuit) 104, a block (or circuit) 106, and a block (or circuit) 108. The circuit 102 may be implemented as an estimation circuit. The circuit 104 may be implemented as a rate control circuit. The circuit 106 may be implemented as an encoder circuit. The circuit 108 may be implemented as a queue circuit.

The circuit 102 may have an input 110 that may receive a signal (e.g., INPUT). The signal INPUT may be a digital video signal comprising a series of frames (or pictures). The signal INPUT may include video and/or audio. The signal INPUT may also include subtitle information. Subtitle information may be text or graphics that are viewable in a portion of a display. Subtitle information normally extends over multiple frames. Subtitle information may be represented as a number of subtitle elements (e.g., En) embedded in the signal INPUT. A timing value (e.g., TEn) for the subtitle elements En may also be embedded in the signal INPUT. The timing value TEn normally represents the presentation start time and/or duration time to display a particular subtitle element En.

The circuit 102 may have an output 112 that may present a signal (e.g., BEn). The signal BEn normally represents an estimate of the size of the subtitle element En produced by the encoder circuit 106. In a typical example, the signal BEn may be represented in bytes. However, other size values may be used to meet the design criteria of a particular implementation. The circuit 102 may also have an input 114 that may receive a signal (e.g., ELEa). The signal ELEa and the signal ELEb may represent a subtitle element that was not initially processed by the encoder circuit 106. The signal ELEa and the signal ELEb are normally held in the queue circuit 108. The encoder circuit 106 may generate a signal (e.g., OUTPUT) in response to (i) the video frames passed through the rate control circuit 104 and the signal ELEa. The encoder circuit 106 may provide transcoding of the frames and the subpicture element signal ELEb.

When the subtitle element En is initially received by the circuit 102 to be encoded, the information normally available in the signal TEn is presented during the corresponding presentation time. In the context of broadcast application (e.g., DVB, Teletext subtitles, etc.) the duration of the subtitle element En is not known in advance. The subtitle element En is entered into the estimator circuit 102. The circuit 102 may provide an estimate about the size of a particular subtitle element En after encoding. The circuit 102 may also provide an estimate about the size of subtitle elements ELEa still in the queue 108. The estimate may be based on factors such as an extrapolation of the previous known values, a theoretical model, etc. An example of a theoretical model may be to base an estimation from how many bits that can be produced at a particular time under known circumstances. The estimate may be provided as a value (e.g., BEn) in bytes. The signal BEn may then be used along with the signal TEn to compute an estimated bitrate needed to transcode the signal INPUT with the embedded subtitle signal En.

A number of thresholds (e.g., A, B, C, etc.) may be defined. The circuit 104 may vary the particular number of thresholds to meet the design criteria of a particular implementation. An example of a number of estimated bitrates may be checked against a number of example thresholds:

Class A<A % of max bitrate
Class B<B % of max birate
Class C<C % of max bitrate
With A<B<C and C<100

When operating in class A, the element En and any previous elements are latched to the encoder 106 to be encoded. When in class B, the element En is stored in the queue circuit 108 in order to be encoded along with the next element En that arrives in the signal INPUT. When in class C, the element En is stored in the queue circuit 108 until the bitrate goes down to at least below class B. The queue circuit 108 presents a stored element signal (e.g., ELEb) to the encoder 106 when resources are available for processing. The encoder circuit 106 may process the stored element signal ELEb along with the element signal ELEa. The estimation circuit 102 may be configured to merge the element signal ELEa and the element signal En to be processed together. The encoder circuit 106 may then insert the subtitle elements at one of a number of predetermined timing windows within the signal OUTPUT. The signal ELEa normally processes elements in class B.

An example of class B operation may occur when multiple subtitles are configured be processed together. In a closed caption example, parts of sentences being displayed as separate words. If the following sentence is "I am reading a newspaper", the words may be displayed as:

I <pause>
am <pause>
reading a <pause>
newspaper.

During class B operation, this example may be displayed after transcoding as:

I am <pause>
reading a <pause>
newspaper.

At the time "I" enters the circuit 102, the system 100 does not have enough bandwidth, so the "I" is stored in queue circuit 108. When the word "am" is received, the system 100 has a bitrate that allows transcoding. The system 100 transcodes the word stored in the queue circuit 108 (e.g., "I") and the and the new word (e.g., "am") together as "I am".

The system 100 may be useful in the context of transcoding DVB subtitle to DVD sub-picture. DVB subtitles have the feature of allowing adding pixels to an existing display, and therefore to form subtitles on the fly. The system 100 may be particularly useful for live broadcasts where the subtitles are typed in by an operator, where typically only new words are sent. For a sub-picture in a DVD format, elements are not added to an existing subpicture. Each subtitle is independent. As a result, when transcoding from DVB to DVD without the system 100, each word or element being added generally needs to generate a new subtitle element, which may cause too many subtitles exceeding the buffer modeling for DVD. With the system 100, a worst case situation may be resolved. If too many words or letters are added at a very high rate, the system 100 may group the words when transcoding the subtitle. For example, with the system 100, instead of generating a subtitle for each element, several elements might show in one subtitle.

The system 100 may be flexible enough to handle additional constraints. For example, in addition to the average bit rate, some standards have additional constraints. In the case of DVD-VR format, no more than one Subpicture Unit (SPU) can be added into a Video Object Unit (VOBU). As a result, in such a system controlling the rate at which the SPUs are generated is needed. The system 100 may be used in such a configuration to provide such control.

Figure 2:
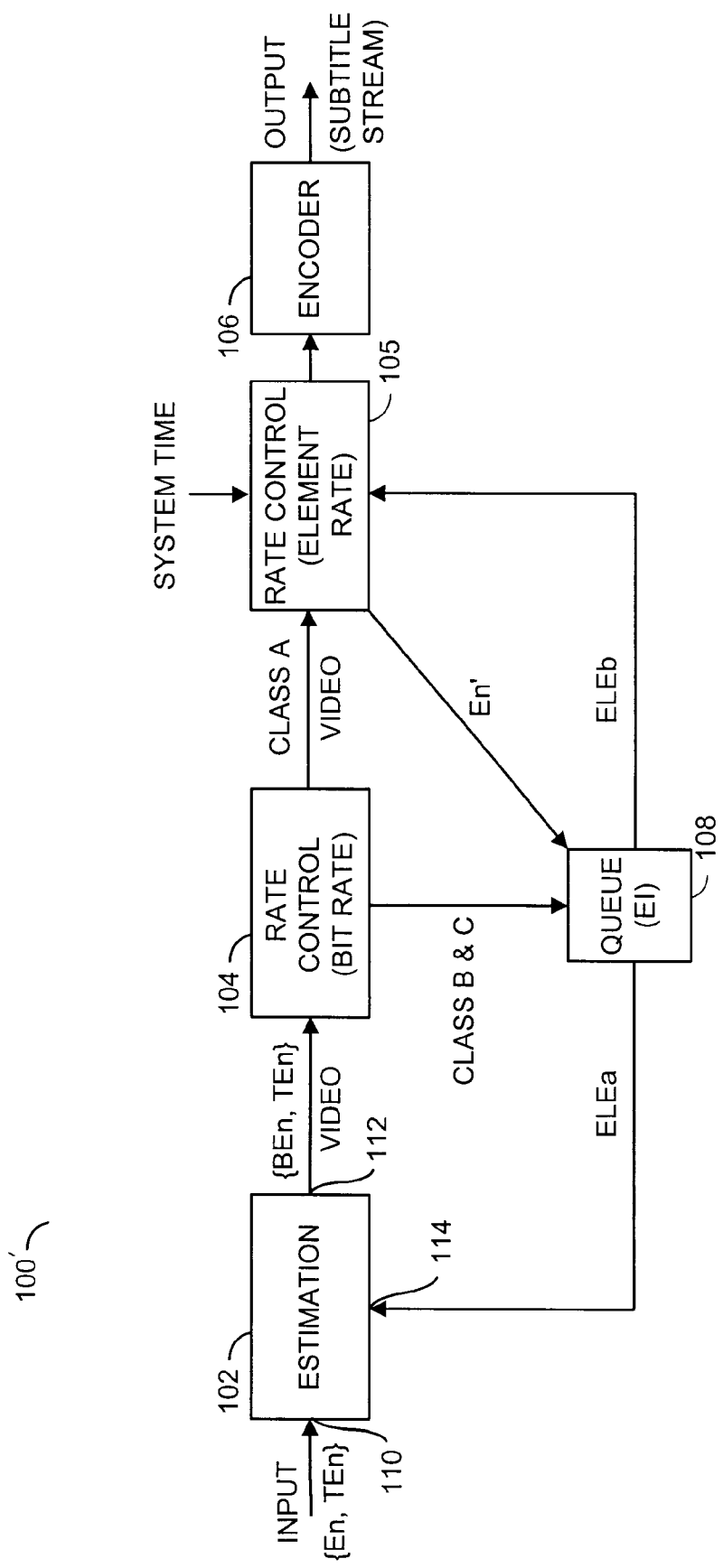
FIG. 2 is a block diagram of another embodiment of the present invention.

Referring to FIG. 2, a diagram of a system 100' is shown illustrating an implementation with element rate control. The system 100' has an additional block (or circuit) 105. The circuit 105 may be implemented as a rate control circuit. The circuit 104 may provide rate control for the bit rate. The circuit 105 may provide rate control for the element rate. The circuit 105 may present a signal (e.g., En') to the circuit 108. When the element En is ready to be encoded, the circuit 105 normally checks for element rate control. If encoding a particular element En causes the system 100' to exceed a predetermined constrained rate, then the element (e.g., En') is presented back into the queue circuit 108. The element En' may then be considered for encoding when the system 100' has additional resources available.

Figure 3:
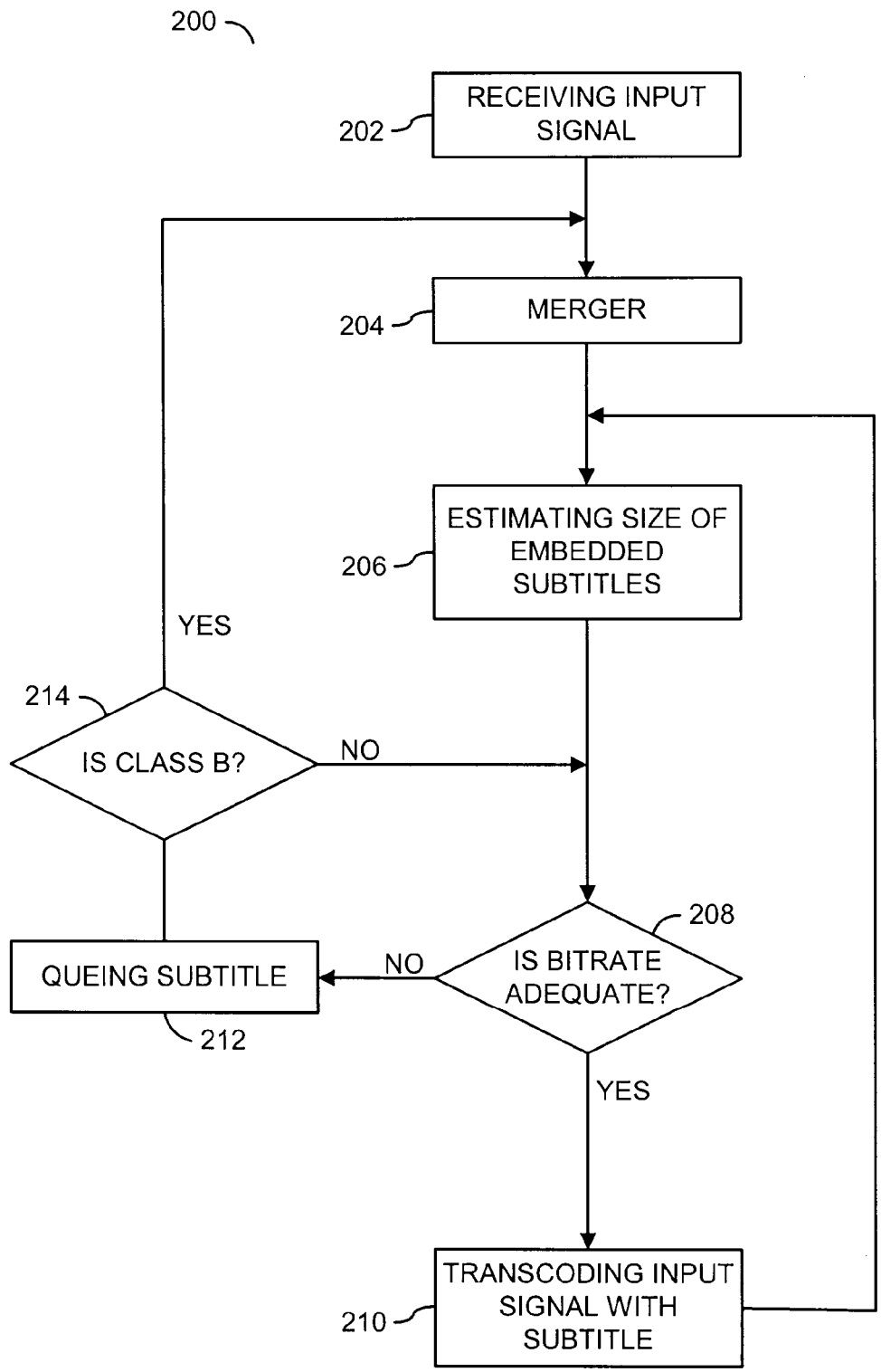
FIG. 3 is a flow diagram illustrating a process for implementing the present invention.

Referring to FIG. 3, a method (or process) 200 is shown in accordance with the present invention. The method 200 generally comprises a step (or state) 202, a step (or state) 204, a step (or state) 206, a decision step (or state) 208, a step (or state) 210, a step (or state) 210, a step (or state) 212 and a decision step (or state) 214. The step 202 receives the signal INPUT. The signal INPUT may be a digital video signal comprising a series of frames (or pictures). The signal INPUT may also include subtitle information. The step 204 may merge two or more subtitles into one to allow to reduce the available bitrate. The step 206 may estimate a size of one of the subtitles. The step 208 determines if an available bitrate is adequate to transcode the frames and embed the subtitle information. If the available bitrate is adequate, the method 200 moves to the step 210. If the available bitrate is not adequate, the method 200 moves to the step 212. The step 210 transcodes the signal INPUT with the subtitle embedded. The step 212 queues the subtitle. After the step 212, the method 200 moves to step 214 to determine if the bitrate is class B. If the bitrate is class B, then the method 200 moves back to step 204. If the bitrate is not class B then the method 200 moves back to step 208. Since the signal INPUT normally varies in the amount of the available bitrate that is used, a subtitle that is not available for transcoding on a first pass through the step 208 may be available for transcoding on a second or subsequent testing by the step 208. After the step 210, the method 200 moves back to the state 206.

In one example, a test stream with a burst of data to be encoded may be used to determine how rate control was performed. Additionally, the present invention may be applicable to a variety of applications. For example, the present invention may be applicable for any transcoding that has variable duration elements (an element being a subtitle in the description above).

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an estimation circuit configured to generate a size value in response to an input signal comprising (i) a plurality of frames and (ii) a plurality of embedded subtitle elements;
   a rate control circuit configured to (i) pass through said plurality of frames, (ii) present a first one or more of subtitle elements for current processing in response to said size value, and (iii) present a second one or more of subtitle elements for subsequent processing;
   a queue circuit configured to (i) receive said second one or more subtitle elements from said rate control circuit, (ii) present said second one or more of subtitle elements processing when an available bitrate is adequate and (iii) hold said second one or more subtitle elements for subsequent processing when said available bitrate is not adequate; and
   an encoder circuit configured to generate an output signal in response to (i) said plurality of frames received from said rate control circuit, (ii) said first one or more subtitle elements received from said queue circuit, and (iii) said second one or more subtitle elements received from said queue circuit.

2. The apparatus according to claim 1, wherein said encoder generates said output signal by inserting one of said first one or more subtitle elements at a predetermined timing window within said output signal.

3. The apparatus according to claim 1, wherein said encoder generates said output signal by inserting one of said first one or more subtitle elements merged with one of said second one or more subtitle elements at a predetermined timing window within said output signal.

4. The apparatus according to claim 1, wherein said encoder generates said output signal by inserting two or more of said first one or more subtitle elements and said second one or more subtitle elements at a predetermined timing window within said output signal.

5. The apparatus according to claim 1, wherein said system provides rate control for real-time transcoding of subtitles.

6. The apparatus according to claim 1, wherein said apparatus provides said rate control in a system with limited memory.

7. The apparatus according to claim 1, wherein said system provides element rate control for real-time transcoding of subtitles in a system having constrained standards.

8. The apparatus according to claim 1, wherein said encoder provides encoding of said plurality of said frames when generating said output signal.

9. The apparatus according to claim 8, wherein said encoding converts said plurality of said frames and said plurality of said subtitle elements from a first type to a second type.

* * * * *